No. 687,877. Patented Dec. 3, 1901.
J. W. GILLIE.
NAUTICAL INSTRUMENT.
(Application filed Mar. 29, 1900.)
(No Model.)

WITNESSES
INVENTOR
John W. Gillie
BY
ATTORNEYS

UNITED STATES PATENT OFFICE.

JOHN WILSON GILLIE, OF NORTH SHIELDS, ENGLAND.

NAUTICAL INSTRUMENT.

SPECIFICATION forming part of Letters Patent No. 687,877, dated December 3, 1901.

Application filed March 29, 1900. Serial No. 10,719. (No model.)

*To all whom it may concern:*

Be it known that I, JOHN WILSON GILLIE, a subject of the Queen of Great Britain, residing at New Quay, North Shields, in the county of Northumberland, England, have invented certain new and useful Improvements in Nautical Instruments, of which the following is a full and complete specification, such as will enable those skilled in the art to which it appertains to make and use the same.

This invention relates to nautical instruments; and the object thereof is to provide a nautical instrument whereby an artificial horizon may be viewed in case the natural horizon is obscured, such viewing of the horizon being incident to the several operations and calculations made upon shipboard for the purpose of determining the latitude and longitude of vessels and other data related to the art of navigation. It is well known that great inconvenience is experienced by navigators and others in foggy and stormy weather in making the necessary observations, and inconvenience as far as traceable to obscurations of the natural horizon is readily overcome by the employment of the nautical instrument which constitutes the present invention.

With the above objects in view the invention consists in the construction and arrangement of parts hereinafter specified.

Figure 1:
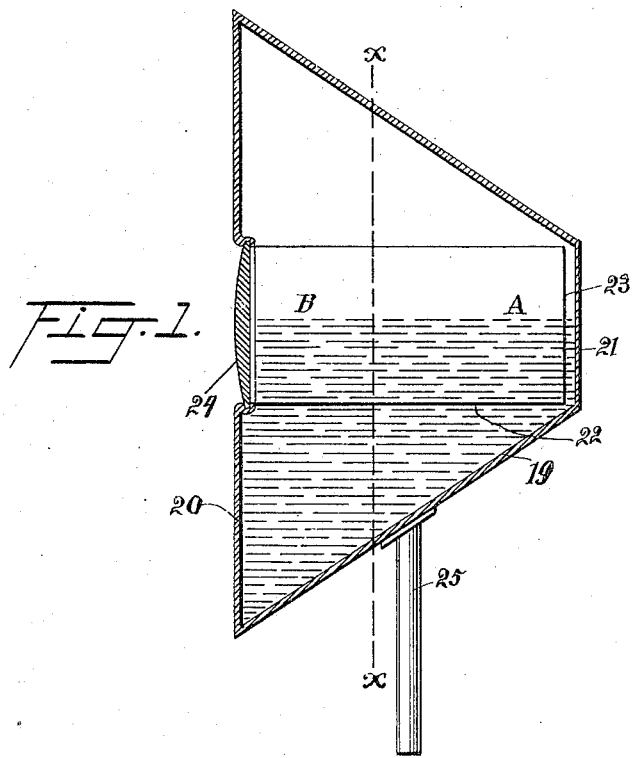
Figure 2:
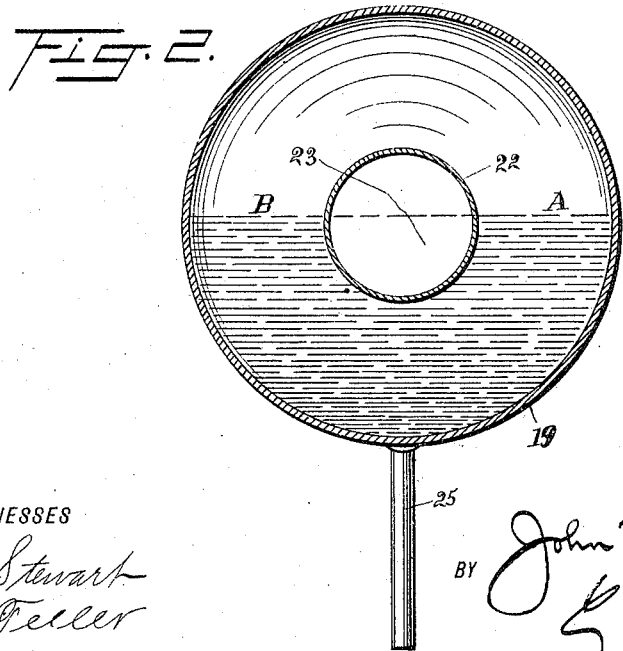

In the accompanying drawings, forming part of this specification, in which like reference characters denote corresponding parts in both views, Figure 1 is a central vertical section of a nautical instrument constructed according to my invention, and Fig. 2 is a vertical section thereof upon the line *x x* of Fig. 1.

In the practice of my invention I provide a main casing 19, which is, as shown in the drawings, of the form of a truncated cone, the base being shown at 20 and the crown at 21. The main casing 19 is filled with oil or other suitable liquid, and arranged therein is a supplemental casing 22, which is preferably tubular in form, and one end of which is sealed by a transparent plate 23 and the other end whereof is sealed by a lens 24. The supplemental casing 22 is preferably of such length that the sealed end 23 passes through the principal focal point of the lens 24. The end of the supplemental casing 22, in which is mounted the lens 24, is fixed to the base 20 of the casing 19, which base 20 preferably consists of a disk of metal centrally cut out to form an opening equivalent in size to the end of the supplemental casing 22. The main casing 19 is provided with a standard or support 25. At A B is shown the normal level of the liquid within the casing 19, and said liquid-level shifts within the main casing to compensate for or in proportion with the roll or pitch of the vessel, which causes a depression or elevation of the horizon-line relative to a fixed instrument of observation upon shipboard.

In using the instrument the observer stands facing the lens and looking through it sees the liquid-surface like a narrow line running across the transparent plate 23. When the ship is lying on an even keel and without keeling, this liquid-surface appears to coincide with the natural horizon. When the vessel rolls or plunges, the liquid-surface rises or falls (owing to the movement of the whole body of liquid contained in the casing 19) and compensates for the movement of the vessel and appears still to practically coincide with the natural horizon, so that when fog or darkness renders the natural horizon invisible the observer may still use this liquid-surface in place thereof. The observer stands with his sextant about a foot or eighteen inches away from the instrument looking into the lens and facing either the sun or star and brings down the reflected image of the sun or star with his sextant until it touches the liquid-line, as seen in the tube through the lens. This liquid-line or artificial horizon he uses in the same way as he would the natural horizon-line formed by the ocean were he able to see it.

Having fully described my invention, I claim as new and desire to secure by Letters Patent—

The herein-described nautical instrument, comprising a main casing, a supplemental casing fixed therein and provided at one end with a lens and at the other end with a transparent plate, liquid contained in said casing and rising to a predetermined level therein, said transparent plate being arranged at a distance from said lens corresponding to the distance from said lens of the principal focal point thereof, substantially as shown and described.

In testimony that I claim the foregoing as my invention I have signed my name, in presence of the subscribing witnesses, this 10th day of March, 1900.

JOHN WILSON GILLIE.

Witnesses:
WILLIAM DIXON,
STEPHEN CAHILL.